United States Patent [19]

Hayman

[11] 4,204,636
[45] May 27, 1980

[54] INTERFACE BETWEEN DATA READING WAND AND CASH REGISTER DISPLAY

[75] Inventor: Richard W. Hayman, Potomac, Md.

[73] Assignee: Stanley Hayman and Company, Washington, D.C.

[21] Appl. No.: 950,967

[22] Filed: Oct. 13, 1978

[51] Int. Cl.² ..................... G06K 15/00; G06K 9/00; G06K 7/10
[52] U.S. Cl. .................................. 235/383; 235/472; 340/146.3 SY
[58] Field of Search ............... 235/472, 382, 379, 380, 235/381, 382, 383, 385; 250/568, 569; 340/147, 149, 146.3 SY

[56] References Cited

U.S. PATENT DOCUMENTS

| | | | |
|---|---|---|---|
| 3,413,447 | 11/1968 | La Mers | 235/472 |
| 3,735,350 | 5/1973 | Lemelson | 235/472 |
| 3,792,236 | 2/1974 | Dobras | 235/472 |
| 3,826,900 | 7/1974 | Moellering | 235/472 |
| 3,963,901 | 6/1976 | Gevas | 235/493 |
| 3,991,299 | 11/1976 | Chadima | 235/472 |

*Primary Examiner*—Robert M. Kilgore
*Attorney, Agent, or Firm*—Gajarsa, Liss & Conroy

[57] ABSTRACT

Circuitry receives data information from a wand and decodes the same for duplicating a keyboard input to a display. The interface circuit includes a plurality of switches paralleling the keyboard input switches and generates autonomously a control signal indicative of a status of the display.

6 Claims, 4 Drawing Figures

INTERFACE BETWEEN DATA READING WAND AND CASH REGISTER DISPLAY

BACKGROUND OF THE INVENTION

1. Field of the Invention

The invention relates to the display of electronically detected signals, and more particularly to interface devices permitting communication between an optical character reading wand and an electronic cash register having a display and a keyboard.

2. Brief Description of the Prior Art

Point of sale devices having keyboards, displays, and processing capability are known. For example, electronic cash registers are available from Sweda International, Inc., 34 Maple Ave., Pine Brook, N.J. 07058. The available models include model 35 as well as Models 600 and 800. The Model 800 is intended to be used with various peripheral devices, including, for example, an optical character recognition wand for reading labels on merchandise items. Other manufacturers include NCR, Dayton, Ohio, Models 280, 255, 2140, 2151; Data Terminal Systems, Maynard, Mass., Model 500 Series; MKD, Cherry Hill, N.J., Comtar 9, and TRW Systems.

Optical character recognition (OCR) wands are available from Recognition Products, Inc., P.O. Box 5569, Dallas, Tex. 75222. One such wand provides an ASCII output representative of a symbol detected by the wand on the label. Prior to transmission of a new character from the wand to the point of sale terminal, a signal is required from the terminal indicating readiness for acceptance of a signal. Other than in asychronously operating wands, such signals must be generated within the point of sale terminal and a "handshaking" sequence is required for transmission of information. Another OCR manufacturer is Caere Corporation, Mt. View, Calif. 94043.

Point of sale terminals and wand readers of the type currently available do not generate the interactive control signals for interfacing one with the other, thus hampering the availability of such wands for the contemplated terminals. Moreover, many electronic cash registers are on the market which were not designed with the contemplation of possible use of a wand, and do not have the facility for generation of any such "user ready" signal for interfacing therewith.

It is accordingly a primary object of the present invention to provide an interfacing means between a data reading wand and a point of sale terminal for enabling the combined use of such devices without requiring the terminal to generate any control signals for the wand.

Accordingly, with the present invention, terminals both with the intended capability of interacting with a wand as well as simpler electronic cash registers without such a capability would be operated in conjunction with a data reading wand, whether the data is read optically, magnetically, electrostatically, or with the aid of any other technology.

Lincoln-Hall Research Compnay of Lima, Ohio, manufactures typically available liquor dispensing equipment utilizing cash registers having encoded keyboards with preset outputs. Actuation of a single key, labelled "Vodka," for example, causes display and registration of a transaction price. The equipment includes a dispenser, providing a single datum of information to the equipment, indicating the conclusion of a transaction wherein a particular liquor was dispensed. The datum of information is similar to that produced by depression of a key on the keyboard and similarly causes display and registration of a full transaction price. Such equipment suffers from the limitation of the number of keys on the keyboard (and hence of possible transactions) and the requirement of special storage and decoding equipment. The present invention provides a full flexibility of data format, and thus for reading of any amount of data by means separate from the keyborad. Such operations save many manual key depressions in entry of data concerning a single transaction into a terminal, whether for computation, storage, or display. Display as used in the present disclosure refers both to transient displays, including visually perceived electronically generated alphanumeric LED or LCD displays and the like, and permanent hardcopy displays, including printed journals, receipts, and the like.

Gott U.S. Pat. No. 4,088,981 discloses the concept of a wand having its own keyboard in communication with a plurality of displays and keyboards. The wand generates a plurality of signals, encoded similarly to the coding of signals generated by one of the plurality of keyboards associated therewith. No indication is given, however, of the interaction between the display unit and the wand other than the disclosure that "enable" and "transmit" keyboard buttons are available on the wand.

The instant invention simplifies the data signals which are communicated to the terminal by decoding the same and effecting instead a set of signals directly duplicative of signals generated by switch closures on the display keyboard. Moreover, a control signal is generated on the interface to eliminate the necessity of communication between the terminal and the wand, otherwise known as "hand-shaking."

Cunningham U.S. Pat. No. 3,812,347 teaches an interface 800 which includes thereon a timing module 818 triggered by a sync detector. The interface is used in conjunction with an optical reader, but merely provides for an indication to the operator of readiness to read or necessity for rereading a label, responsive to the detected or undetected synchronization. The present invention generates a timing signal to satisfy a requirement of the wand, specifically to provide an indication of readiness on the part of the terminal to accept further data, irrespective of whether the terminal is or is not so ready. Since many point of sale terminals include therein audible "beeper" sounds to indicate an inaccurate or erroneous data reading situation, the present interface accordingly relies upon the operator to detect whether the terminal was in fact ready to receive the data. By thus removing the feedback nature of the signals required to be interchanged between the terminal and the wand, a great simplicity in circuitry results and a saving in manufacturing cost ensues.

Mak et al. U.S. Pat. No. 3,238,501 utilizes a self-clocking feature in a wand. Such a synchronous operation, however, requires additional circuitry on any receiving terminals. The present invention, by utilizing arbitrary timing generators on an interface, synchronizes the wand output data with the decoding capability provided on the interface in a simple and inexpensive manner.

Other references of lesser interest include Ferry U.S. Pat. No. 920,940, where the keyboard of a typewriter and an adding machine are paralleled, and Chadima et al. U.S. Pat. No. 3,991,299 wherein a bar code reader bypasses a keyboard and generates signals equivalent to those converted from the keyboard for direct insertion into memory. An audio alarm is provided for the operator to retry transmission if the data is bad.

Additional references include Neff U.S. Pat. No. 4,048,617, illustrating a feature of a wand available from Recognition Products, Inc. Additionally, LeMers U.S. Pat. No. 3,413,447 connects a wand to a cash register and provides for actual operation of the cash register keyboard keys by the wand output. Dobras et al. U.S. Pat. No. 3,792,236 includes handshaking signals circuitry associated with a bar code reader, and Humbarger U.S. Pat. No. 3,585,367 includes a clock generator in a wand, along with a sample signal generator responsive to the clock.

SUMMARY AND OBJECTS OF THE INVENTION

In addition to the objects hereinabove described, it is an object of the present invention to provide a universal interface between character reading wands and display terminals having input means therefor.

More specifically, it is an object of the invention to provide an interface having an output signal duplicating the signals generated by the input means to the display signal, for simple substitution of the output signals for the input signals and straightforward display thereof.

Still another object of the invention is the simplification of circuitry required to communicate with a character reading wand by generation of a control signal arbitrarily, thus eliminating a feedback loop in the system and providing a saving in circuitry.

Another object is the provision of a decoding means for signals output by a character reading wand, the decoding means being triggered by signals from the wand as well as by timing signals generated on the interface.

Yet another object is the utilization of a human operator in a wand-display system, to perform a simple task, responding to an alarm generated by the terminal to rescan a label, thus eliminating the requirement for complicated interaction circuitry needed between the wand and the display unit.

In accordance with these and other objects of the invention, an interface board is provided having thereon a means for decoding signals output by a character reading wand. A means generating a set of signals which duplicate those acceptable by the display is further provided, and is activated by the decoding means.

Additionally, timing means is provided on the interface board for triggering the decoding means as well as for providing a signal expected by the wand prior to generation of a next output signal.

These and other objects, features, and advantages of the present invention will become more readily apparent from the following specification and appended claims, when considered in conjunction with the attached drawings.

DETAILED DESCRIPTION OF THE INVENTION

During recent years the desirability of automated data input for various data manipulating and/or display systems, including but not limited to point of sale terminals and like, has become evident.

Data input by manual means, such as keyboards, is time consuming and error prone, while automated data entry is known to be quick, efficient and relatively error free. Accordingly, various means have been developed for such automated data reading, including optical character recognizing devices, code reading devices, magnetically operated devices, mechanically actuated readers, etc. Other such devices may similarly be developed in the future, including electrostatically sensitive devices and the like.

Such data reading devices may be designed in conjunction with the system accepted the output therefrom. However, in view of the large variety of data processing systems currently available, manufacture and distribution of standardized, stand-along data reading devices providing a coded output signal has become a commercial reality. Thus, the OCR WAND (trademark of Recognition Equipment, Inc.) is available from Recognition Products, Inc., Dallas, Tex. The device is optically sensitive to human readable labels and includes processing circuitry for performing the optical character recognition function, as well as the encoding function.

While some models of optical data readers operate asynchronously and provide data output to cash registers, point of sale terminals, and other data processing systems, such asychronous communication is more difficult to maintain on the part of the receiving terminal than communication synchronized by the receiver.

Accordingly, wands are available which provide data to the user terminal upon receipt of a "user ready" signal.

Since typical user terminals are equipped with alarms, whether audio or visual, indicating erroneous data or too rapid transmission of data, the present invention provides for the use of a wand reader effectively in a synchronized mode with a receiving terminal, but without requiring the receiver to generate a ready signal.

As will become clear from the sequel, the wand will be provided with information directing the transmission of a character to the user without requiring the user to generate such information. Specifically, a signal is generated independently of the user, relying upon the human operator to detect an alarm in the event of error. However, the information transmitted to the wand may be so adjusted as to minimize the chance of error even without the operator's sensitivity to the alarm.

Figure 1A:
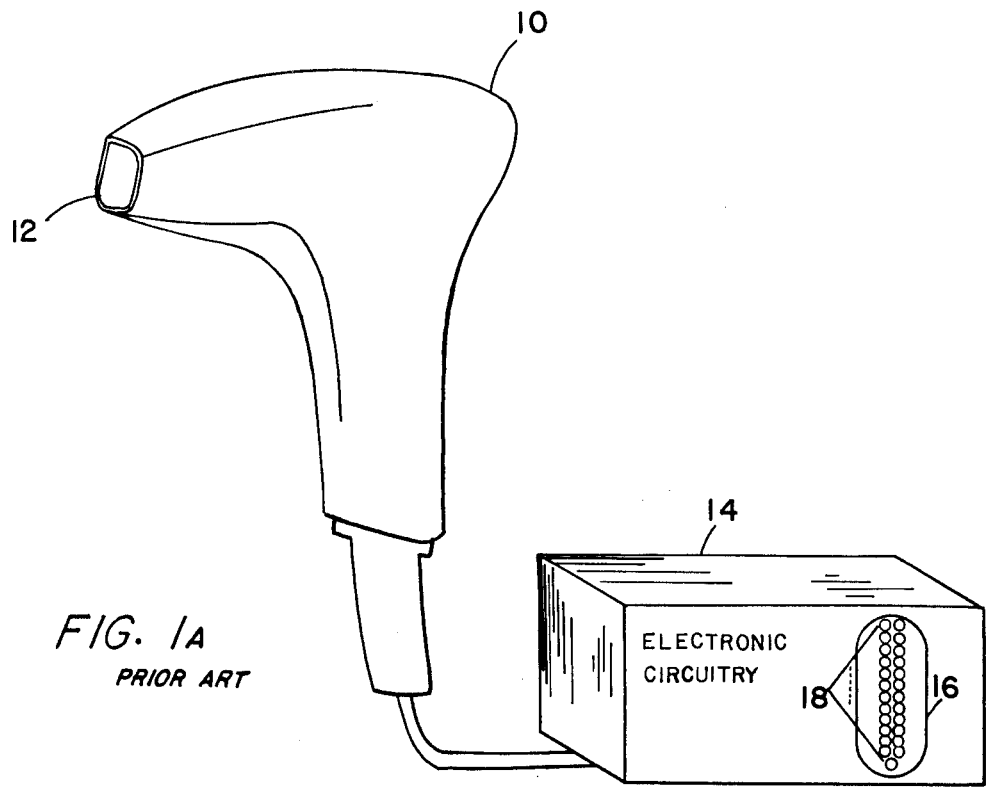
FIG. 1A illustrates a data reader, particularly a OCR wand reader, commercially available.

Referring now to FIG. 1A, a hand held data reader is shown in the form of a wand at 10, particularly of the optical type and having an optical window 12. Associated with the reader is electronic circuitry and processing equipment 14 to perform the character recognition or code recognition function, as well as to perform the various processing steps required to encode and transmit the recognized characters to a user terminal. Such circuitry may be provided in the reader itself, or, as shown in FIG. 1A, the electronic circuitry 14 may be enclosed in a box attached to the reader. The circuitry 14 generates a plurality of electronic signals according to predetermined functions, and provides the same on output connector 16 having a plurality of connecting pins 18 therein.

Figure 1B:
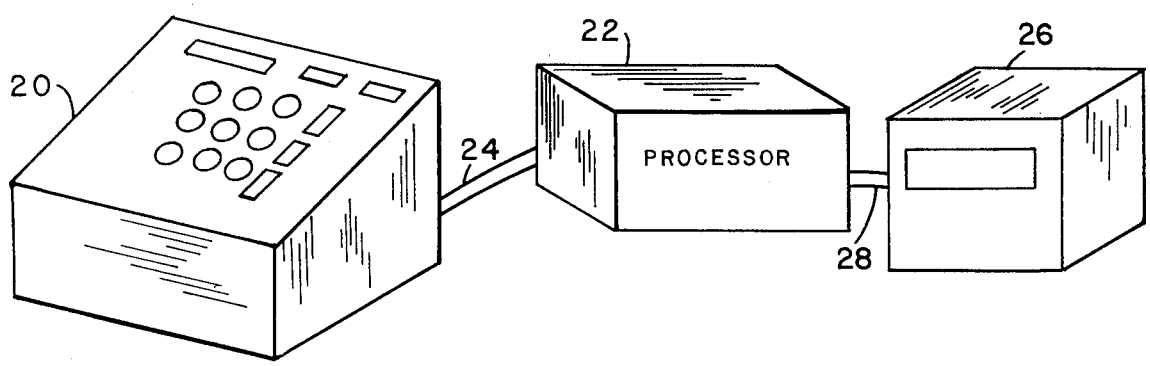
FIG. 1B schematically shows a data display system for which the present interface is designed.

FIG. 1B symbolically illustrates a user terminal for the signal generated by the reader of FIG. 1A. Specifically, for terminals used in the point of sale or cash register environments, keyboards, displays and processing units are ordinarily included therein. In FIG. 1B keyboard 20 is shown as connected to a processor 22 by means of connecting wires 24. A display 26 receives output signals from processor 22 over wires 28.

It is appreciated that a user terminal may not have a display and may merely provide processing means for data which is input at keyboard 20. Alternatively, displays may provide hardcopy permanent records. Moreover, clearly the three devices shown separately in FIG. 1B may be combined in a single housing as is typically done for cash registers.

In attempting to interconnect the data reader of FIG. 1A with the user terminal of FIG. 1B, previous efforts have concentrated on directly providing the signals output at connector 16 to processor 22 for decoding and for providing the various signals required by the electronic circuitry 14. Such efforts, however, require additional processing capability in processor 22, in either software or hardware, as well as added physical space for such capability.

The present invention, takes into account the requirements of circuitry 14 as well as the possible limitations of user terminals as shown in FIG. 1B, and overcomes the problem as discussed below. The approach utilized herein is to assume virtually no processing capability on the part of the user terminal for the signals output by the electronic circuitry 14 associated with data reader 10. Nonetheless, the requirements of circuitry 14 must still be met.

Rather than providing added processing capability in the interface, the present invention artificially generates a signal required by circuitry 14 without reference to processor 22.

Figure 2:
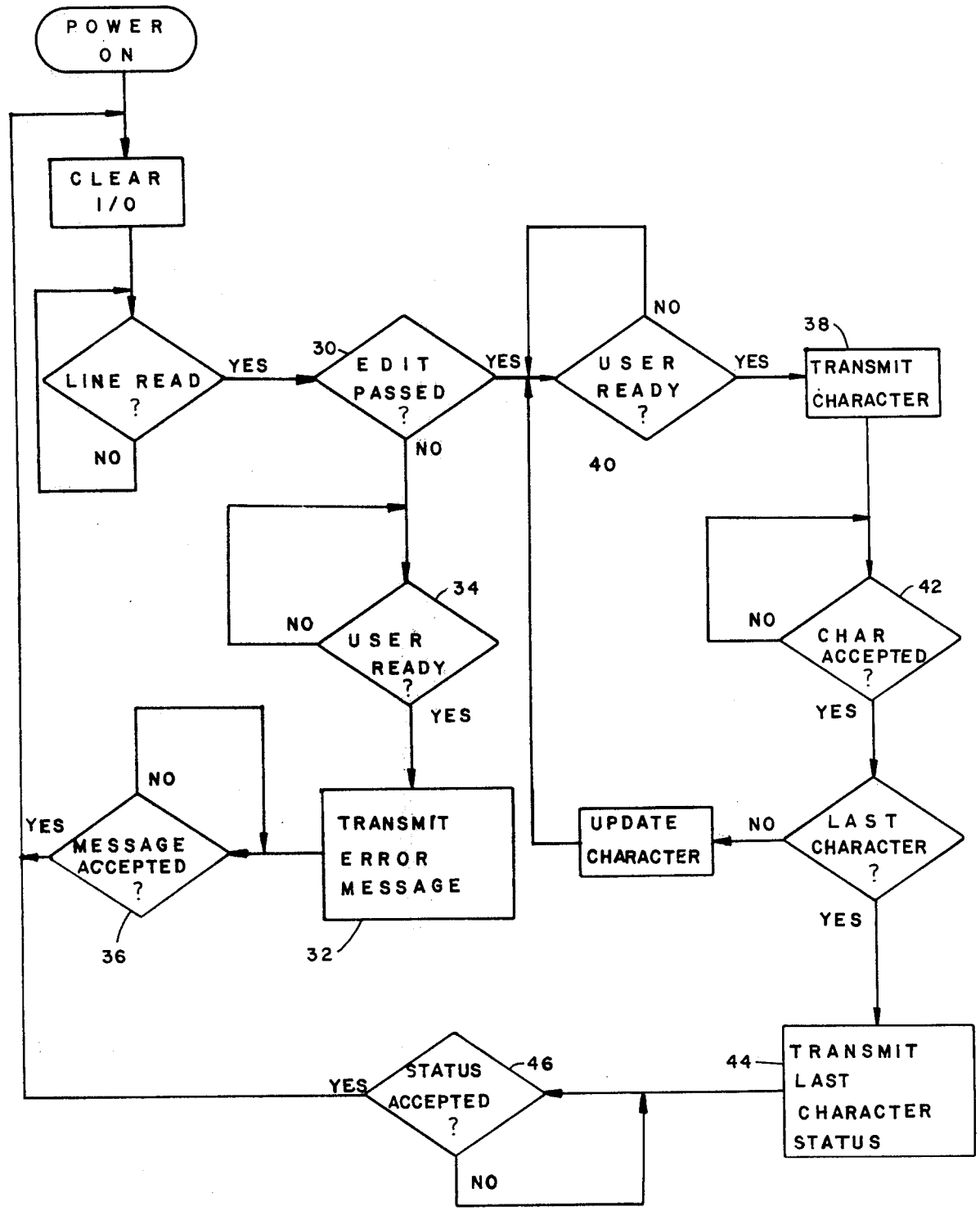
FIG. 2 shows a functional flow chart for a typical wand as shown in FIG. 1A.

Referring now to FIG. 2, a flow chart is shown illustrating the functional operation of the circuitry 14. The flow chart is obtained from the manufacturer (Recognition Equipment) in a publication entitled "OCR Wand ® Reader Specifications."

As is readily seen in the figure, the circuitry requires responses from the user terminal at five different points.

In operation, connector 16 includes 25 pins, representing the following information.

Pins 1 through 6: data bits;
Pin 7: edit check;
Pin 8: end of transmission;
Pin 9: data ready;
Pin 10: user ready;
Pins 16 through 25: ground.

Figure 3:
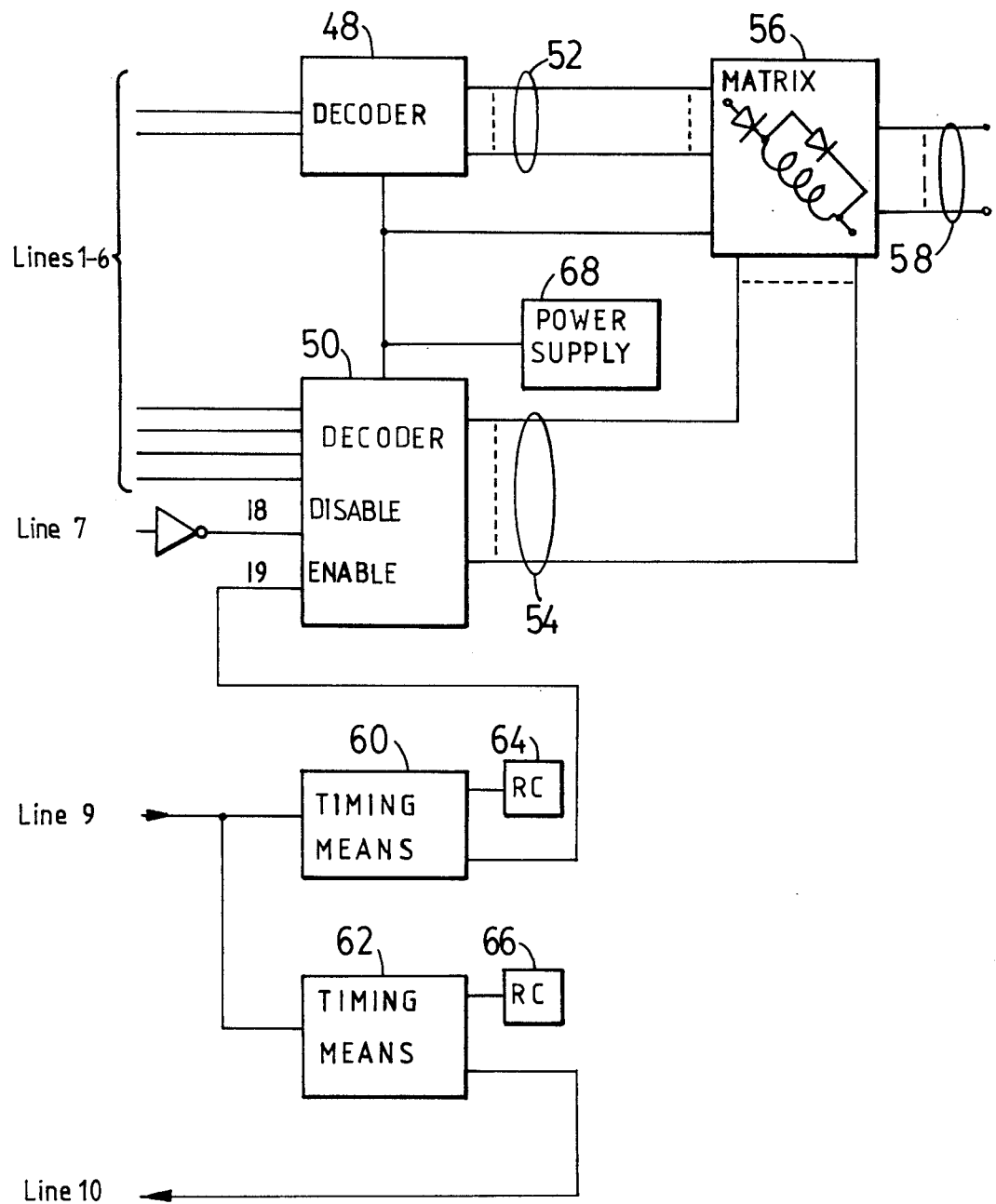
FIG. 3 is a logic diagram for the present invention.

FIG. 3 shows corresponding lines connected to Pins 1–7, 9 and 10.

Operationally, the user initiates communication with the data reader by setting line 10. The reader then prepares data for transmission. Upon successfully editing the data, six bits of data (comprising a character) are placed on lines 1 through 6. If the edit is unsuccessful, line 7 is set. This acitivity occurs at decisional box 30 of FIG. 2. In the event that line 7 is set, the error message is not transmitted by box 32 until information is obtained, in box 34, that the user is ready, specifically by noting line 10. At that point the error message is transmitted, and the circuitry expects the signal on line 10 to change state once more, thus indicating acceptance of message, as shown in box 36.

In the event that the characters read have been properly edited without error, the character is transmitted to the user at 38, but only after an indication is obtained at 40 that the user is ready, again via line 10.

Once the character is transmitted at 38 it is again expected that line 10 will change state, as an indication of acceptance of the character at 42.

Line 8 is set to indicate the end of transmission at 44, and acceptance of that status by the user is expected at 46, again by a change on line 10. The transmission of information between the two units, though initiated by the user of line 10, is not consummated, at 32, 38 or 44, until line 9 is set at the reader circuitry. At that point, line 10 is used to indicate readiness for acceptance of the data.

The generation by processor 22 of signals indicative of the user ready state, and the interaction with the signal indicative of the data ready state is eliminated by the present invention as shown in FIG. 3.

FIG. 3 shows the structure of the present invention, and includes two decoders 48 and 50 for the six data bits output by circuitry 14. Specifically, decoder 48 receives two of the data bits and decodes the same to select one of four output lines 52, while decoder 50 receives four of the output data bits from circuitry 14 and activates one of sixteen output lines 54. The output lines 52 and 54 are used to drive a relay coil matrix 56, including an array of diodes and relay coils as shown symbolically in the figure. Alternatively, a matrix of optical circuits or other devices may be driven by decoders 48 and 50.

A plurality of wires 58, connected to the various relays activated by the coils in the matrix, provide open-closed information for the various relays, simulating the signals output from keyboard 20 on wires 24. That is, the two decoders act on the ASCII data output by circuitry 14 to convert the same to switch closures. The switch closure information is carried on lines 58. Lines 58 may be directly connected to lines 24, or may be connected to a connector in processor 22 receiving the keyboard output lines 24.

As contemplated, processor 22 receives switch closure information activated either by a particular key on keyboard 20 or by decoding a particular ASCII key character recognized by data reader 10. Regardless of whether the key or the data reader is the source of the information, the processor receives the same data and processes and operates upon that data as if a key on the keyboard had been pressed. Similarly, the processor provides the data to display 26. In the event that no processor is utilized in the system, clearly the invention may still be used in that any keyboard having switch closure information output therefrom, whether going to a display, to a processor, etc., may be paralleled or bypassed by the circuit of FIG. 3 there responding to an output of a data reader. Further, since some keys on keyboard 20 represent functions, the data reader may be used to cause the terminal to perform predetermined functions.

The interface circuit further includes two astable multivibrators 60 and 62. Data from line 9 output by circuitry 14 is input to both multivibrators 60 and 62. Multivibrator 60 provides an output signal to the enabling input of decoder 50. The disable input of decoder 50 receives the inverted form of the data on line 7 output by electronic circuitry 14. Thus, assuming that no error exists (decoder 50 is not disabled), upon transmission of a data ready signal on line 9 from circuitry 14, astable multivibrator 60 will enable decoder 50, thereby selecting a particular relay in matrix 56 response to the data on lines 1 through 6 of circuitry 14. To insure proper timing, an RC time adjusting circuit 64 is provided to adjust the delay between receipt of the signal on line 9 and enabling of decoder 50. Other time adjusting means may also be used.

Line 10, expecting receipt of user ready signals from a processor such as 22, is instead connected to the output of astable multi-vibrator 62. Accordingly, upon receipt of a data ready signal on line 9, multivibrator 62 generates the expected pulse on line 10, without communication with processor 22. To assure proper delay before sending a simulated user ready signal on line 10, RC timing circuit 66 is provided for astable multivibrator 62.

Accordingly, it is seen that with the aid of the circuitry of FIG. 3 the signals output by reader 10 via circuitry 14 are decoded to provide signals simulating keyboard key closures, the decoding of the recognized characters being delayed by astable multivibrator 60 until stabilization of the signals. The function of line 7 output from circuitry 14 is maintained by disabling the decoding, the line 10 receives a signal indicative of user readiness, whether or not the user terminal is indeed ready. As previously indicated, if the user is not ready, an alarm may be generated causing the operator to rescan the data.

Additional features of the interface include the utilization of a voltage regulated power supply 68, providing output voltages to the various components, and particularly to the relays in matrix 56. Further, an additional jumper-type connection box may be utilized on lines 58 to provide rearrangement of the output wires to correspond with specific keyboard arrangements of various cash registers or other data processing or display systems. As will be appreciated by those skilled in the art, other timing devices may be used to enable decoder 50 in response to a signal on line 9 and to generate the desired signal on line 10. For example, standard oscillators using 555 timers, available on integrated chips from National Semiconductor, may be utilized. Other one-shots or crystal oscillators may similarly be used. Moreover, in terminals wherein a particular busy signal is generated, such a signal may be either sensed or tapped, and used to provide the necessary timing signals, possibly after inverting or other processing.

The present invention, as shown on FIG. 3, may be mounted on a single circuit board. As such, the board may be installed in a separate housing and may be connected to circuitry 14 and to processor 22 or to keyboard 20 by standard connectors. Connection may be made to the same circuits, ports, etc., having the output of keyboard 20 thereon. Alternatively, connecting wires 24 may be interrupted and a connection made thereto, for establishing the output of the invention directly in parallel with the output from keyboard 30. It is also possible that a circuit board having the invention mounted thereon may be mounted in the same chassis housing electronic circuitry 14, with obvious modifications of connection to connector 16. It is similarly possible that the circuit board may be mounted in the user terminal, or any of the components thereof, such as the keyboard, the processor, or output equipment (display, printer, or the like), along with changes in the connectors used therein.

The decoders contemplated in the present invention include chips available from Texas Instruments as SN74154 for decoder 50, and SN7442 for decoder 48. Astable oscillators 60 and 62 may be chips No. SN74123, also available from Texas Instruments.

The preceding specification describes, by way of illustration and not of limitation, a preferred embodiment of the invention. Equivalent variations of the described embodiment will occur to those skilled in the art. Such variations, modifications, and equivalents are within the scope of the invention as recited with greater particularly in the following claims, when interpreted to obtain the benefits of all equivalents to which the invention is fairly entitled.

I claim:

1. In combination with data reading means having encoded data output, display means, processing means, manual input means providing switch closure information, and means directing said switch closure information to said processing means for converting said switch closure information to a format suitable for display on said display means, an interface apparatus comprising:
   (a) means for converting said encoded data output to data simulating said switch closure information, and
   (b) means connecting said data simulating said switch closure information to said directing means,
   wherein said processing means and said display means cooperate upon receiving information for display from either said manual input means or from said data reading means, independently of the source of said information for display.

2. The combination recited in claim 1 wherein said data reading means comprises interacting means for communication with said processing means and for transmitting said encoded data output only upon receipt of a first signal by said interacting means from said processing means, said interface apparatus further comprising means for simulating said first signal independently of said processing means, and
   means for transmitting said simulated first signal from said simulating means to said interacting means.

3. In a data entry system comprising keyboard means for manual input keying of data and for providing keyed data, display means accepting a predetermined data format for display, and processing means for converting said keyed data to said predetermined data format for display by said display means, the improvement comprising:

(a) data reading means having encoded data output,
   (b) apparatus for enabling said data system to accept said encoded data output from said data reading means for processing and display, including means for converting said encoded data output to a format simulating said keyed data,
   thereby enabling said data system to accept for processing and display without special modification data from said data reading means and the data from said keyboard means.

4. Data entry system as recited in claim 3 wherein said data reading means comprises interacting means for communication with said processing means and for transmitting said encoded data output only upon receipt of a first signal by said interacting means from said processing means, said apparatus for enabling further comprising means for simulating said first signal independently of said processing means, and means for transmitting said simulated first signal from said simulating means to said interacting means.

5. Data entry system as recited in claim 4 wherein said means for converting said encoded data output comprises decoding means and relay means responsive to said decoding means for providing said format simulating said keyed data.

6. A method for entering data from a wand reader to a keyboard terminal comprising the steps:

detecting a control signal indicating that data is ready to be read from the wand reader;

automatically generating a response thereto simulating a condition wherein a user is ready to accept such data;

reading the data from the wand;

converting the data to a preselected formatted signal;

decoding the formatted signal as equivalent to corresponding keyboard entries, thereby simulating such keyboard entries; and processing the data in the same manner as if it were entered on the keyboard.

* * * * *